(12) United States Patent
Reid

(10) Patent No.: US 6,820,816 B1
(45) Date of Patent: Nov. 23, 2004

(54) THERMOSTATIC MIXING VALUE

(75) Inventor: William Reid, Renfrewshire (GB)

(73) Assignee: The Horne Engineering Co. Ltd., Renfrewshire (GB)

( * ) Notice: Subject to any disclaimer, the term of this patent is extended or adjusted under 35 U.S.C. 154(b) by 0 days.

(21) Appl. No.: 10/311,346
(22) PCT Filed: Jul. 5, 2001
(86) PCT No.: PCT/GB01/02973
§ 371 (c)(1), (2), (4) Date: Oct. 1, 2003
(87) PCT Pub. No.: WO02/33500
PCT Pub. Date: Apr. 25, 2002

(30) Foreign Application Priority Data

Jul. 5, 2000 (GB) .............................. 0016482

(51) Int. Cl.$^7$ ............................................. G05D 23/13
(52) U.S. Cl. .................................. 236/12.13; 236/12.2
(58) Field of Search ........................... 236/12.13, 12.2; 137/625.4

(56) References Cited

U.S. PATENT DOCUMENTS

| 2,903,009 | A | | 9/1959 | Tacchi | |
|---|---|---|---|---|---|
| 2,905,387 | A | * | 9/1959 | Powell | ................... 236/12.13 |
| 2,978,182 | A | * | 4/1961 | Sigfrid | ................... 236/12.13 |
| 3,001,717 | A | * | 9/1961 | Rimsha et al. | ........... 236/12.13 |
| 5,551,630 | A | * | 9/1996 | Enoki et al. | ............. 236/12.13 |
| 6,079,625 | A | | 6/2000 | Lebkuchner | |
| 6,257,493 | B1 | * | 7/2001 | Chamot et al. | .......... 236/12.13 |

FOREIGN PATENT DOCUMENTS

| EP | 0487987 | 6/1992 |
|---|---|---|
| EP | 1048997 | 11/2000 |

* cited by examiner

Primary Examiner—William E. Tapolcai
(74) Attorney, Agent, or Firm—Jacobson Holman PLLC

(57) ABSTRACT

A thermostatic mixing valve (TMV) for operation across a range of flow rates wherein during low pressure operation water enters the TVM (100) into chamber (157) around the circumference of the valve member (150) and cold valve seat (140) and hot water enters into chamber (158), the hot and cold water entering chamber (235) and becoming thoroughly mixed. At low pressure drops, the check valves (230) remain closed so the only pathway the mixed water can follow is through the sensing chamber (125) and the mixed water enters discharge portion (120) to the mixed water outlet (245), the flow path of the hot and cold water shown by pathways (255) and (260), the water becomes thoroughly mixed before entering the sensing chamber (225). For high flow rate operation the water enters and is mixed within the valve as before but in this case the pressure drop across the check valve operates the check valves (230), allowing the mixed water to follow an additional route to the discharge portion (120) and thence to the outlet (245) with additional flow pathway (265) through the valves (230), ensuring accurate temperature sensing.

12 Claims, 4 Drawing Sheets

THERMOSTATIC MIXING VALUE

This is a nationalization of PCT/GB01/02973, filed Jul. 5, 2001 and published in English.

The present invention relates to thermostatic mixing valves and in particular to variable rate thermostatic mixing valves.

Thermostatic mixing valves (TMVs) are well established and serve to provide a fluid (water) supply at a desired temperature. For this purpose, TMVs have a thermostatic device to control the relative proportions of hot and cold fluids passing in the valve to a mixing zone whence the mixed fluids are caused to impinge on a temperature responsive element of the thermostatic device. Control of the hot and cold flows is achieved by the thermostatic device being operatively coupled to a valve member controlling fluid flows through hot and cold inlet ports of the valve. Consequently, when there is an undesirable rise in the temperature of the mixed fluid the thermostatic device expands to cause the valve member to reduce the hot flow via the hot inlet port and increase tile cold flow via the cold inlet port to restore the fluid supply temperature condition to that desired, with a converse operation when there is a fall in the mixed fluid temperature.

It is established practice to have the hot and cold inlet ports (controlled by the valve member) of a substantially 360° form, with the valve member constituted by a slide or poppet valve device, and for the provision of a suitable fluid flow to the 360° port the TMV usually employs fluid feed ducts extending laterally to the TMV casing and each feeding to a respective annular chamber within the valve casing, appropriate wall formations being present in the casing to contain fluid flow in each clamber. In a known design the galleries surround their respective hot and cold inlet ports of the TMV. GB-A-2096274 and FR-A-1310027 show such an arrangement. This invention is not necessarily limited to such arrangements, however.

Large bore TMVs are used to supply a number of outlets, such as groups of showers, wash basins or baths. The TMVs must be capable of passing substantial amounts of properly mixed water when a number of outlets are being used simultaneously. The internal arrangement of the TMV should be designed such that the high flow rate can be passed without an unduly high pressure drop. This means that the internal passages are relatively large and the annular passage round the thermostat element must also be relatively large to avoid causing any restriction to the mixed water flow under the maximum demand.

There are, however, drawbacks in such arrangements. One well know problem in thermostatic mixing valves of larger bores is that of achieving sufficient mixing of hot and cold water across a range of flow rates.

When there is a low demand for mixed water the velocity of the hot and cold water streams passing through the TMV drops and is insufficient to mix the two streams fully. The result is that the streams may become laminar and mixing of the hot and cold supplies does not take place. If this happens, then the water surrounding the thermostat element is not fully mixed and as a result the thermostat element may receive a false signal. When this happens the thermostat element is not able to expand or contract as required to control the mixed water temperature. The overall result, therefore, is a loss in control of mixed water temperature.

One known approach to this problem is to provide two separate TMVs operating in parallel with each other (as illustrated and described below with reference to FIG. 1). A small bore TMV can be fitted in parallel with a large bore TMV in conjunction with additional equipment such as a pressure reducing valve or some other throttling device on the outlet of the large bore TMV. Thus, when there is a low demand for mixed water the hot and cold streams only pass through the small bore TMV and not the large bore TMV.

There are disadvantages in this approach in that it requires extra hardware in the form of two TMVs and a throttling device such as a PRV downstream from the larger TMV to implement the TMV which adds to costs. Additional installation steps and maintenance may also be required, and temperature regulation is a function of two individual TMV characteristics.

It is the principal object of the present invention to provide a device for use in a TMV which overcomes the problems of mixing fluids over a range of high and low flow rates.

In particular it is an object of the invention to provide a single TMV capable of handling both high and flow rates automatically whilst retaining a sufficiently effective and reliable thermostatic mixing control function.

According to the principles of operation of the invention to be more particularly described hereinafter, a TMV is provided wherein the arrangement is such that hot and cold fluids are mixed, and the temperature of the mixed fluids is sensed by means operatively connected to a valve actuator enabling a desired temperature profile to be maintained within certain parameters by adjustment of the mixing ratio of hot to cold fluids, and wherein there is provided means permitting by-pass of a proportion of the mixed fluids particularly at high flow rates without loss of the temperature control function.

The invention in particular provides a thermostatic mixing valve for operation over a range of fluid flow rates, comprising housing parts and operating parts accommodated within an operating space defined by the housing parts, said operating parts including:

a valve member movable within the operating space so as to define first and second valve ports respectively, said first valve port tending to open while the second valve port is closing and vice versa, depending on the direction of movement of said valve member;

inlet ducting for delivering first and second fluids at different temperatures to said first and second valve ports respectively;

a mixing space within said operating space arranged to receive said fluids from the valve ports and permit mixing thereof;

a temperature-sensitive actuator, at least a sensing part of the actuator being located within a sensing space within said operating space, said sensing space being in communication with both of said first and second valve ports thereby to receive the mixture of fluids, said actuator being arranged to cause movement of the valve member so as to counteract temperature changes of said fluid mixture; and a discharge space downstream of said sensing space, wherein further valve means are provided responsive to demand for fluid at said discharge space, so as to force the mixed fluid to flow via said sensing space in close proximity to said sensing part of the actuator at times of low demand, while permitting a portion of said mixture to bypass said sensing space under conditions of high demand, thereby to permit an increased flow rate.

By providing a bypass within the valve which opens only at times of high demand, it can be arranged that the velocity of the fluids where they meet is sufficient for turbulence and mixing, both at low flow rates and high overall flow rates.

In one embodiment the further valve means is a pressure-responsive valve means, responsive to an increased pressure difference between points upstream and downstream of the sensing space to open a conduit between said points. The further valve means closes below a pressure drop and, therefore, flow rate for which fluid mixing within the mixing space would be unable to take place efficiently.

The sensing space and mixing space may be distinct, or may be formed substantially as one space within the housing.

In one embodiment, said operating space and operating parts are generally cylindrical and have rotational symmetry about an axis of the valve. The temperature-sensitive actuator may be arranged centrally, extending along said axis. The valve member may be a cylindrical slide valve moving axially between first and second annular valves seats, thereby to define said first and second valve ports as annular ports. The inlet ducting may comprise an entry to one side of the valve axis, feeding into an annular gallery space surrounding said valve ports.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1:
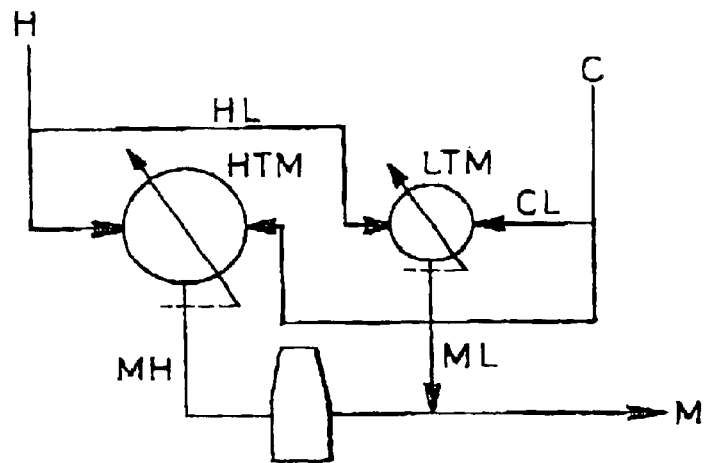
FIG. 1 shows a thermostatic mixing valve arrangement in accordance with the prior art.

FIG. 1 shows a thermostatic mixing valve arrangement for use in variable demand hot water systems in accordance with the prior art. A hot water supply H and a cold water supply C are provided which feed high capacity thermostatic mixing valve HTM and low capacity thermostatic mixing valve LTM. The two mixing valves HTM and LTM are connected to a mixed water supply M via MH and ML respectively.

Such mixing systems are designed to manage systems where flow rates may vary from 0 to 100% of capacity, such as in multiple shower fittings. When demand is high, the flow rate of water supplies H and C will be high and the output mixed water supply M will be high. The pressure drop across each valve depends on the demand for mixed water and the restriction represented by the valve mechanism in the fluid paths. A pressure valve responsive to high pressure drops permits flow via high flow rate mixing valve HTM wherein the hot and cold water is mixed to provide mixed water supply M at the desired temperature. Conversely, when the demand is low the supplies H and C will be routed only via the low rate mixing valve LTM, where the water is again mixed to provide mixed water supply M at the desired temperature.

Two thermostatic mixing valves are necessary in variable demand environments as the mixing characteristics of valves are not uniform over a range of flow rates. Smaller mixing valves work well at lower flow rates but restrict the total flow. It is not possible to simply use larger mixing valves, because a valve designed to give good mixing at high flow rates will fail to do so at low flow rates, principally because water moving slowly is not sufficiently turbulent to ensure thorough mixing.

Considerably more components are needed to implement a dual thermostatic mixing valve arrangement compared to a single mixing valve arrangement. In addition to requiring two mixing valves instead of only one, the setup will include additional parts such as a pressure valve inlet and outlet valve assemblies, gauges and piping. The connection to the inlet and outlet supplies will also be complicated compared to a single mixing valve setup. Moreover, the use of two separate thermostats makes it harder to maintain a desired temperature setting over the range of flow rates. Adjusting the temperature on two valves is of course more complicated than adjusting the temperature on one valve.

Figure 2A:
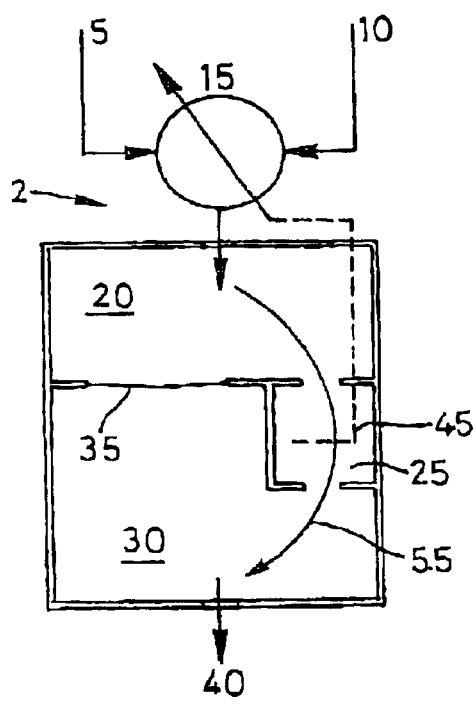
FIG. 2 is a schematic representation of one aspect of the invention.
Figure 2B:
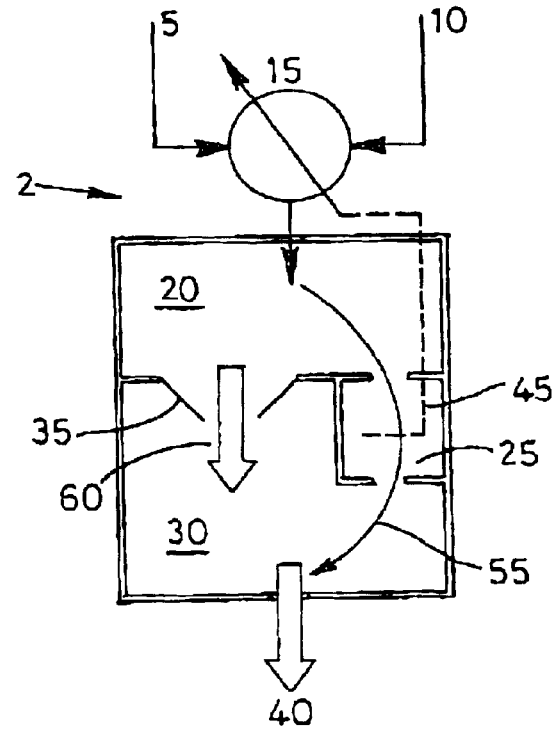

FIGS. 2A and 2B show a representation of a scheme to manage both high and low flow rates within a single thermostatic mixing valve arrangement 2. Hot water supply inlet 5 and cold water supply inlet 10 feed a thermostatic control valve 15. This is connected to a mixing chamber 20 wherein the water becomes mixed. A flow path through thermostatic sensing chamber 25 to an outlet chamber 30 is provided. A valve 35 provides an additional route for the water, but only in the presence of a certain pressure differential between chambers 20 and 30 from the mixing chamber 20 to the outlet chamber 30. The mixed water exits the outlet chamber from outlet port 40. A thermostatic sensing element 45 is present in the sensing chamber 25 and provides the control for the thermostatic control valve 15.

The control valve is capable of controlling the proportion of hot and cold water fed into the mixing chamber 20 and the operation of which is controlled by the thermostatic sensing element 45. When the temperature of the water surrounding the sensing element 45 rises, it expands and moves the control valve to increase the flow of cold water and decrease the flow of hot water to maintain the required mixed water temperature. Similarly, when the mixed water temperature is too cold the sensing element contracts and moves the control valve 15 to increase the flow of hot water and decrease the flow of cold water. Thus the required mixed water temperature is maintained (at least approximately) throughout.

FIG. 2A represents the case for relatively low flow rate of water supply. The hot and cold supplies 5, 10 are fed via the thermostatic control valve 15 into the mixing chamber 20. The mixed supply passes through the sensing chamber 25 where the sensing element 45 senses the mixed water temperature and co-operates with the control valve accordingly to control temperature as previously explained. The mixed water then passes through outlet chamber 30 and outlet port 40 to the required service outlet. Under low pressure drops and low flow rates the valve 35 remains closed so that all the water flow is directed through sensing chamber 25 to the outlet chamber 30, as indicated by the path 55.

FIG. 2B represents the case for higher flow rates. The operation of the mixing valve is substantially as indicated above but above a certain level of demand, the high pressure sensitive valve 35 opens. The mixed water supply flowing from the mixing chamber 20 now has an additional route, indicated by path 60, enabling the valve assembly to manage higher flow rates. The mixed supply still also follows the path 55 for the low pressure case allowing the correct mixed water temperature to be sensed. When the demand falls and the pressure differential across valve 35 falls, the valve will close and the mixed water will revert to the more restricted path described in FIG. 2A. Clearly, for the single element 45 to maintain effective control of the temperature in both high flow and low flow situation, the flow paths must be such that the fluid which bypasses the sensing chamber is a mixture corresponding to the mixture in the sensing chamber. That is, the entrance to the pressure-responsive valves should not be sited so as to draw fluid predominantly from the path of relatively unmixed hot or cold fluid. A detailed example is presented below, for illustration.

The single valve assembly is thus able to manage both low and high flow rates.

Figure 3A:
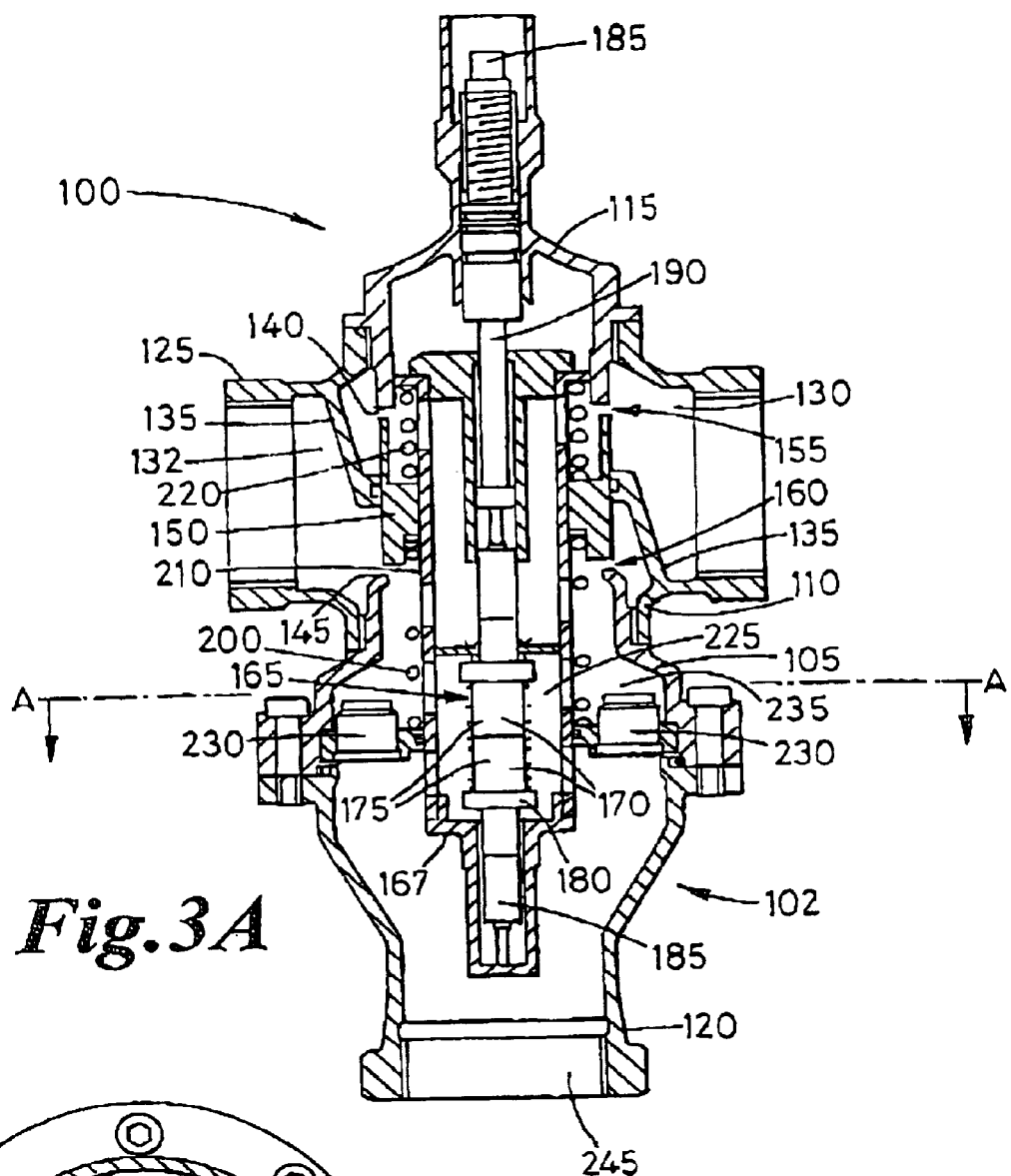
FIG. 3A is an axial cross-section of a thermostatic mixing valve in accordance to one embodiment of the invention.
Figure 3B:
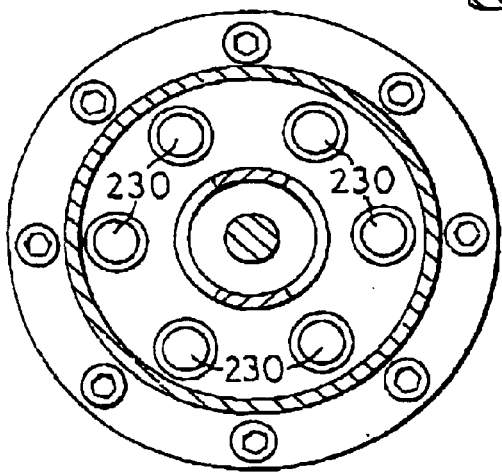
FIG. 3B shows a radial section on line A–A' in the thermostatic mixing valve FIG. 3A.

FIGS. 3A and 3B show, in axial and transverse cross-section view respectively, a variable flow rate thermostatic mixing valve (TMV) 100 according to one embodiment of the invention. The skilled reader will understand that the majority of the valve parts are circularly symmetric about the axis running vertically as shown in FIG. 3A.

The TMV 100 comprises a casing 105 including a main body 110, a cover 115 and a discharge portion 120, the main body 110 including lateral ducts 130, 132 for the cold and hot water feeds respectively and a partition wall 135 dividing the body 110 into the cold and hot portions. The wall 135 is arranged such that each duct 130, 132 leads into a gallery space, surrounding the cover 115 and discharge portion 120. The cover 115 and discharge portion 120 provide facing seats 140, 145 engageable by end seating surfaces on a cylindrical valve member 150 of slide valve type, an annular (360°) cold inlet port 155 being present at the seat 140 while a corresponding annular hot inlet port 160 is present at seat 145, the size of these ports being controlled by the valve member 150.

Controlling movement of the valve member 150 is effected by a thermostatic actuator 165 coupled to the valve member 150 and contained within housing 167. The thermostatic actuator 165 comprises 2 thermostatic devices 170 enabling the actuator 165 to enjoy the necessary expansion for desired movements of the valve member 150. Two thermostatic devices acting in series, as shown here, may be provided to increase the range of movement available to the valve 150. Each thermostatic device 170 comprises a temperature responsive (expandable) element 175 extending from a flange 180 with a further (non-active) locating part 185 extending from the other side of the flange 180. The internal construction of the elements is not material to the present invention. Typically, the element contains a wax material loaded with copper dust, which pushes internally against a diaphragm to increase the overall length of the device 170, as temperature of the wax increases.

The cover 115 has a temperature setting spindle 185 threaded therein with a seal between the spindle 185 and the cover 115. The spindle 185 reacting with the thermostatic actuator 165 via a rod device 190 for positional setting of the actuator 165. Outward movement of the actuator 165 is resisted by a return spring 200 located between a shoulder on the discharge portion 120 and an annular rib 210 in the valve member 150 while a further outwardly located spring 220, is positioned between the rib 210 and a top flange, to cater for over-expansion of the actuator 165.

The cold feed duct 155 feeds cold feed to an annular chamber 157 (not shown) surrounding the cold inlet port 155, the inner boundary of the chamber being partly defined by a wall of the valve member 150, while a similar chamber 158 is present to receive hot feed supplied via the hot feed duct 132 and surrounds the hot inlet port 160.

A sensing chamber 225 is dined by the thermostatic devices 170 of the thermostatic actuators 165 and the inner wall of the thermostatic actuator housing 167.

A annular arrangement of spring check valves 230 are provided between chamber 235 defined by the casing 105 and thermostatic actuator housing 167. The valves open responsive to an increase in pressure drop across the chamber 235.

Figure 4:
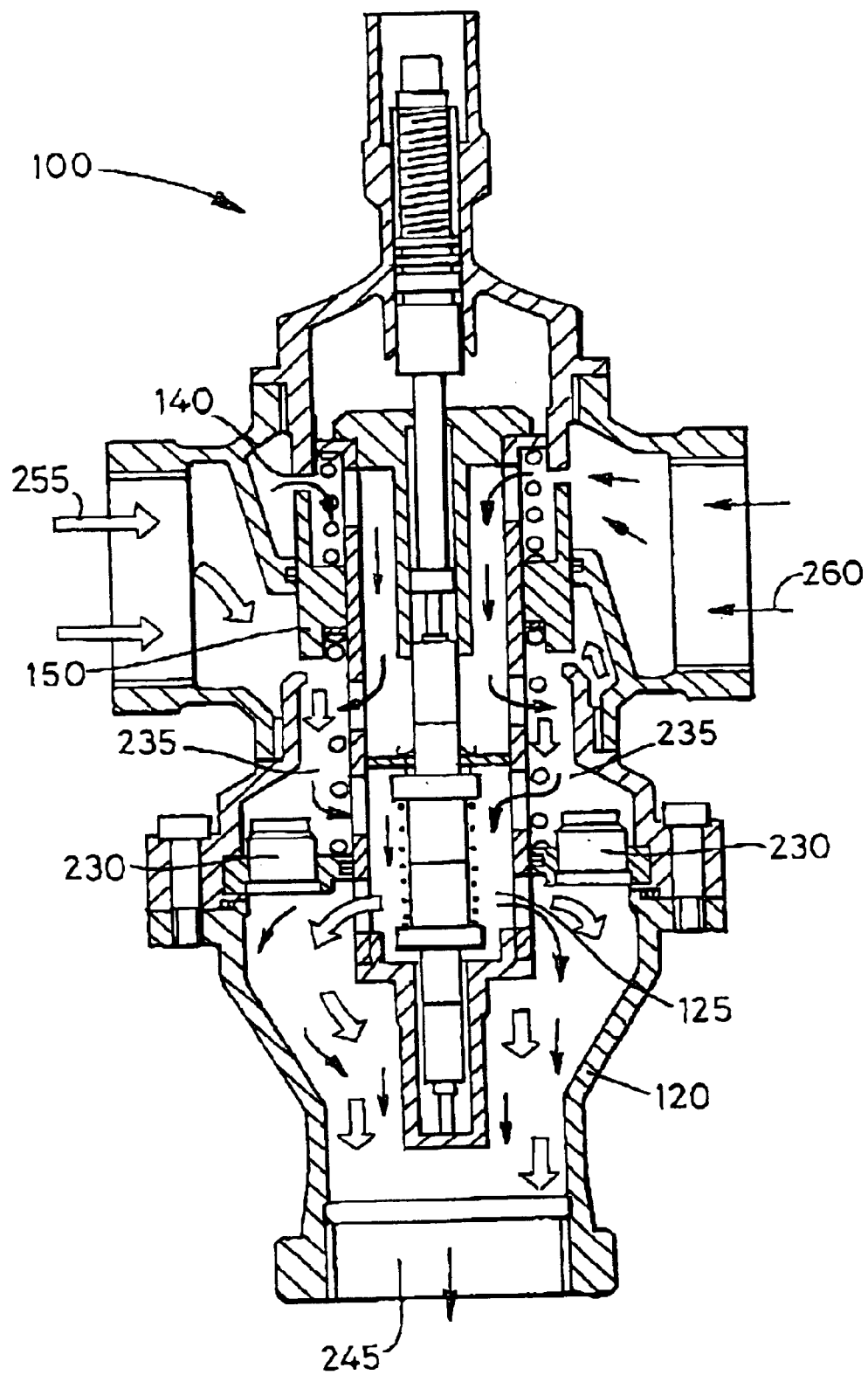
FIG. 4 shows fluid flow through the TMV at low flow rates.

FIG. 4 illustrates the low pressure operation of the TMV of FIG. 3. Cold water enters the TVM 100 into chamber 157 around the circumference of the valve member 150 and cold valve seat 140. Similarly, hot water enters the TVM 100 into chamber 158. The hot and cold water enters chamber 235 and becomes mixed. At low pressure drops, the check valves 230 remain closed so the only pathway the mixed water can follow is through the sensing chamber 225.

The temperature of the mixed water is controlled by the thermostatic actuators 165. The actuators 165 move the valve member 150 against the return spring 200. When the temperature of the water surrounding the elements 170 rises, the elements expand and move the valve member 150 towards the hot valve seat 145 and away from the cold valve seat 140 to reduce the inflow of hot water and increase the inflow of cold water. Conversely, when the temperature of the water surrounding the elements falls, the elements contract and the return spring moves the valve member towards the cold valve seat and away from the hot valve seat thereby reducing the inflow of cold water and increasing the inflow of hot water, so as to maintain the desired mixed water temperature. The mixed water then enters the charge portion 120 to the mixed water outlet 245.

The flow path of the hot and cold water is shown by pathways 255 (outline arrows) and 260 (filled arrows) respectively. The water becomes thoroughly mixed upon entering the sensing chamber 225, the mixed water represented here as alternate outline and filled arrows.

Figure 5:
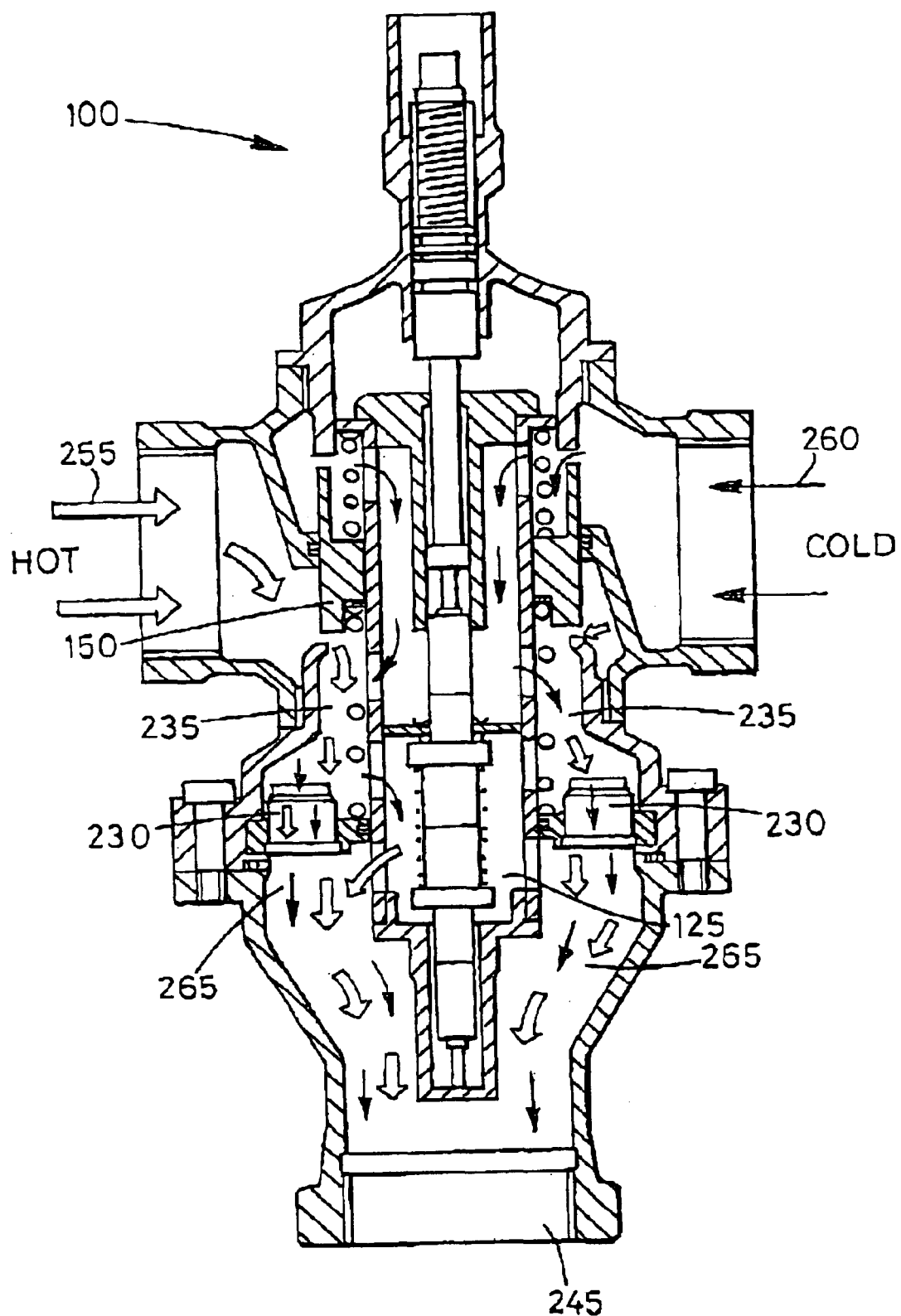
FIG. 5 shows fluid flow through the TMV at high flow rates.

FIG. 5 illustrates the high flow rate operation of the TMV of FIG. 3. The water enters and is mixed within the valve as before. However, in this case the pressure drop across the check valve is great enough to operate the check valves 230. This allows the mixed water to follow an additional route to the discharge portion 120 and thence to the outlet 245. The flow path is shown as before by pathways 255 and 260 showing the additional flow pathway 265 through the valves 230.

The addition of the pressure sensitive valves allows for a single valve to be used for both low and high flow rate situations.

The skilled reader will appreciate that the invention is not limited to the specific implementations and applications detailed above. The valves can be of any type sensitive to pressure. The valves may be spring loaded check valves which open completely once a certain pressure has been reached, or be valves of a type which open gradually in response to a rise in pressure. It is also possible to configure the valves 230 to be responsive to different pressure values such that they react in sequence to changes in pressure. Thus as the pressure increase, more valves open, and as the pressure decreases the valves close again. The valves 230 are here illustrated in an annular arrangement around the sensing element and six in number but may be of any configuration or number to allow the desired fluid pressure dependent bypass of fluid necessary to allow the proper functioning of the TMV.

What is claimed is:

1. A thermostatic mixing valve for operation over a range of fluid flow rates, comprising housing parts and operating parts accommodated within an operating space defined by the housing parts, said operating parts including:

a valve member movable within the operating space so as to define first and second valve ports respectively, said first valve port tending to open while the second valve port is closing and vice versa, depending on the direction of movement of said valve member, inlet ducting for delivering first and second fluids at different temperatures to said first and second valve ports respectively;

a mixing space within said operating space arranged to receive said fluids from the valve ports and permit mixing thereof;

a temperature-sensitive actuator, at least a sensing part of the actuator being located within a sensing space within said operating space, said sensing space being in communication with both of said first and second valve ports thereby to receive the mixture of fluids, said actuator being arranged to cause movement of the valve member so as to counteract temperature changes of said fluid mixture;

a discharge space downstream of said sensing space, and further valve means for responding to demand for fluid at said discharge space, so as to force the mixed fluid to flow via said sensing space in close proximity to said sensing part of the actuator at times of low demand, while permitting a portion of said mixture to bypass said sensing space under conditions of high demand, thereby to permit an increased flow rate.

2. A thermostatic mixing valve as claimed in claim 1 wherein the further valve means is a pressure-responsive valve means, responsive to an increased pressure difference between points upstream and downstream of the sensing space to open a conduit between said points.

3. A thermostatic mixing valve as claimed in claim 2 wherein the further valve means closes below a certain pressure difference and, therefore, flow rate.

4. A thermostatic mixing valve as claimed in claim 1 wherein the sensing space and mixing space are formed substantially as one space within the housing.

5. A thermostatic mixing valve as claimed in claim 1 wherein said operating space and operating parts are generally cylindrical and have rotational symmetry about an axis of the valve.

6. A thermostatic mixing valve as claimed in claim 5 wherein the temperature-sensitive actuator is arranged centrally, extending along said axis.

7. A thermostatic mixing valve as claimed in claim 6 wherein the valve member is a cylindrical slide valve moving axially between first and second annular valve seats, thereby to define said first and second valve ports as annular ports.

8. A thermostatic mixing valve as claimed in claim 7 wherein the inlet ducting comprises an entry to one side of the valve axis, feeding into an annular gallery space surrounding said valve ports.

9. A thermostatic mixing valve as claimed in claim 2 wherein the further valve means comprises a plurality of spring loaded check valves which open completely once a certain pressure difference has been reached.

10. A thermostatic mixing valve as claimed in claim 2 wherein the further valve means are of a type which open gradually in response to a rise in pressure difference.

11. A thermostatic mixing valve as claimed in claim 2 wherein the further valve means comprises a plurality of configured to be responsive to different pressure valves such that they react in sequence to changes in said pressure difference.

12. A thermostatic mixing valve as claimed in claim 1 wherein the further valve means are automatically responsive to changes in demand for fluid at said discharge space.

\* \* \* \* \*